(12) United States Patent
Ramos

(10) Patent No.: US 12,618,252 B2
(45) Date of Patent: May 5, 2026

(54) FRAME JOINT FOR AN ABOVE-GROUND POOL

(71) Applicants:Belgravia Wood Limited, Hong Kong (HK); Jaime Ramos, Moorpark, CA (US)

(72) Inventor: Jaime Ramos, Moorpark, CA (US)

(73) Assignee: Belgravia Wood Limited, Central (HK)

( * ) Notice: Subject to any disclaimer, the term of this patent is extended or adjusted under 35 U.S.C. 154(b) by 956 days.

(21) Appl. No.: 17/596,240

(22) PCT Filed: Jun. 5, 2020

(86) PCT No.: PCT/US2020/036373
§ 371 (c)(1),
(2) Date: Dec. 6, 2021

(87) PCT Pub. No.: WO2020/247785
PCT Pub. Date: Dec. 10, 2020

(65) Prior Publication Data
US 2022/0307279 A1    Sep. 29, 2022

(30) Foreign Application Priority Data
Jun. 5, 2019    (CN) .......................... 201920841161.1

(51) Int. Cl.
*E04H 4/00* (2006.01)
*F16B 5/00* (2006.01)
(52) U.S. Cl.
CPC ............. *E04H 4/0056* (2013.01); *F16B 5/00* (2013.01)

(58) Field of Classification Search
CPC ................................................... E04H 4/0056
See application file for complete search history.

(56) References Cited

U.S. PATENT DOCUMENTS

| | | |
|---|---|---|
| 6,561,373 B1 | 5/2003 | Connolly |
| 6,742,198 B2 | 6/2004 | Lee |
| 2006/0002759 A1* | 1/2006 | Blackman ................. F16B 7/18 403/109.3 |
| 2009/0113819 A1 | 5/2009 | Lee |

(Continued)

OTHER PUBLICATIONS

International Search Report dated Oct. 14, 2020 for International Application No. PCT/US2020/036373 (3 pages).

*Primary Examiner* — Lauren A Crane
(74) *Attorney, Agent, or Firm* — Finnegan, Henderson, Farabow, Garrett & Dunner LLP

(57) ABSTRACT

A joint for an above-ground pool frame is disclosed. A variety of above-ground pool types are considered. Above-ground pools must be assembled before use and disassembled after use in a lengthy and time-consuming process to be stored properly and maintain modularity. The presently disclosed joint can ease the assembly and disassembly processes. The pool can comprise a plurality of joints configured to join at least the two or more horizontal support members through insertion. The presently disclosed joint can comprise at least a portion cutaway configured to laterally receive at least one horizontal support member from two or more horizontal support members. The presently disclosed joint can also be configured to receive at least one vertical support member. This and other embodiments are disclosed herein.

20 Claims, 7 Drawing Sheets

(56)            References Cited

U.S. PATENT DOCUMENTS

| | | | |
|---|---|---|---|
| 2009/0144892 A1 | 6/2009 | Brindle | |
| 2016/0215513 A1* | 7/2016 | Liu | E04H 4/1272 |
| 2016/0222686 A1 | 8/2016 | Liu | |
| 2017/0089085 A1* | 3/2017 | Liu | E04H 4/0056 |
| 2017/0356206 A1* | 12/2017 | Huang | E04H 4/0056 |

* cited by examiner

510

520

530

540

220

225

220

225

FRAME JOINT FOR AN ABOVE-GROUND POOL

CROSS REFERENCES TO RELATED APPLICATIONS

This application is the National Phase of PCT International Application No. PCT/US2020/036373, filed on Jun. 5, 2020, which claims priority under 35 U.S.C. § 119(e) to CN application No. 201920841 161 1, filed on Jun. 5, 2019. The entire contents of the above-referenced applications are incorporated herein by reference.

FIELD OF THE DISCLOSURE

Embodiments of the present disclosure generally relate to above-ground pools, and, more particularly, to frame joints for above-ground pools.

BACKGROUND

Simply described, pools are containers of water for people to swim, wade, relax, and play in. In their many forms, pools can be above-ground pools that extend up from the ground, or below-ground pools that extend down into the ground. Above-ground pools can sometimes be temporary, providing relaxation and enjoyment along with the ability to be removed and stored after use. Below-ground pools, however, are usually more permanent. Many types of above-ground pools exist. Some designs, for example, can be inflatable. Other designs can have metal frames and sidewalls, or modular panels that attach to one another. Above-ground pools can come in any number of different shapes and sizes. While above-ground pools provide the convenience of storage and flexibility of being temporary, the need remains to assemble the pool before use and disassemble the pool when it is no longer needed.

No matter the design, shape, or size of the above-ground pool, all pools must be assembled and disassembled to retain the advantage of storage and modularity of the above-ground pool. These processes are labor and time intensive, especially when considering a pool with a metal frame. Whenever it is desired to assemble the pool, all portions of the pool frame must be assembled properly to retain the structural integrity of the pool. When using such a rigid frame, the user may experience difficulty in fitting the proper pieces together. Disassembling the pool is equally as important for the benefit of storage but can be equally as difficult when considering a rigid frame. Improved methods for assembling and disassembling a pool and improving the user experience while maintaining the benefits of an above-ground pool are desirable.

SUMMARY

Aspects of the presently disclosed technology relate to an improved above-ground pool frame portions and methods for joining the frame portions. The improved frame portions retain the modularity and storage convenience of the pool while improving the ease of operation and time consumed for the assembling and disassembling process. Embodiments of the present disclosure address this need as well as other needs that will become apparent upon reading the description below in conjunction with the drawings.

A collapsible container with a frame and joints for joining frame components is disclosed. Specifically, in some embodiments, the disclosed technology can provide a collapsible swimming pool with a frame comprising a plurality of improved joints. In some embodiments, the pool can comprise a base, at least one sidewall defining the entire pool area and joined to the base, and a support element (i.e., frame) for keeping the sidewall elevated off the ground. In some embodiments, the frame can comprise a plurality of horizontal support members and vertical support members, and a plurality of joints configured to join two horizontal support members and one vertical support member. In some embodiments, a first end of a vertical support member can be affixed to the ground, and the second end can be received into one of the joints. Additionally, the joints can comprise at least one cutaway portion configured to laterally receive a horizontal support member. The pool can further comprise insertable elements for connecting the joint and the horizontal support member and for connecting the joint and the vertical support member. In some embodiments, the horizontal and vertical support members can be selected from the group consisting of a flexible pole, a rod, and a bar.

As disclosed herein, the at least one sidewall can be a unitary sidewall formed from a single sheet. In some embodiments, the base can be rectangular, rectangular with rounded corners, square, square with rounded corners, circular, oval, oblong, elliptical, triangular, pentagonal, hexagonal, octagonal, or decagonal. Accordingly, the at least one sidewall and base can comprise polyurethane, PVC, nylon, vinyl, or a textile coated with a material impermeable to water.

The pool can be described as incorporating a side wall, as a preferred embodiment which can comprise a circular-shaped pool having but a single side, but as will be understood by those skilled in the art, the pool may include more than one side or a plurality of sides.

In some embodiments, the pool can comprise at least one drainage aperture in the side wall and a drain. The drain can further comprise a drain hole configured to fit within the drainage aperture. The drain can further comprise a drain plug member and a locking member. In some embodiments, the drain plug member can be configured to detachably attach to the drain hole in a closed position. In other embodiments, the drain plug member can be configured to detachably attach to the locking member in an open position. In some embodiments, the drain assembly can be disposed on a side wall of the pool through a standard attachment method such as welding. Additionally, the drain itself can be disposed on a side wall of the pool through a standard attachment method such as welding.

In some embodiments, the pool comprises a base, a side wall joined to the base, and at least one porthole comprising a transparent material. In other embodiments, the fluid container comprises a base, and a side wall, having a substantial portion being transparent, joined to the base, and a drain. For example, the side wall can comprise a generally transparent sheet attached to the side wall. The transparent sheet can be attached to the side wall by one or more welds. In some embodiments, the side wall may comprise a single, transparent layer.

In accordance with some embodiments, the pool can be supported by a frame. For example, support members such as vertical rib supports, can be coupled proximate the side wall of the pool. The supports can be attached to some of the material making up the side wall and can also be attached to a support ring proximate the top of the pool.

Further features of the invention, and the advantages offered thereby, are explained in greater detail hereinafter with reference to specific embodiments illustrated in the accompanying drawings, wherein like elements are indicated by like reference designators.

Reference will now be made to the accompanying figures, which are not necessarily drawn to scale.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
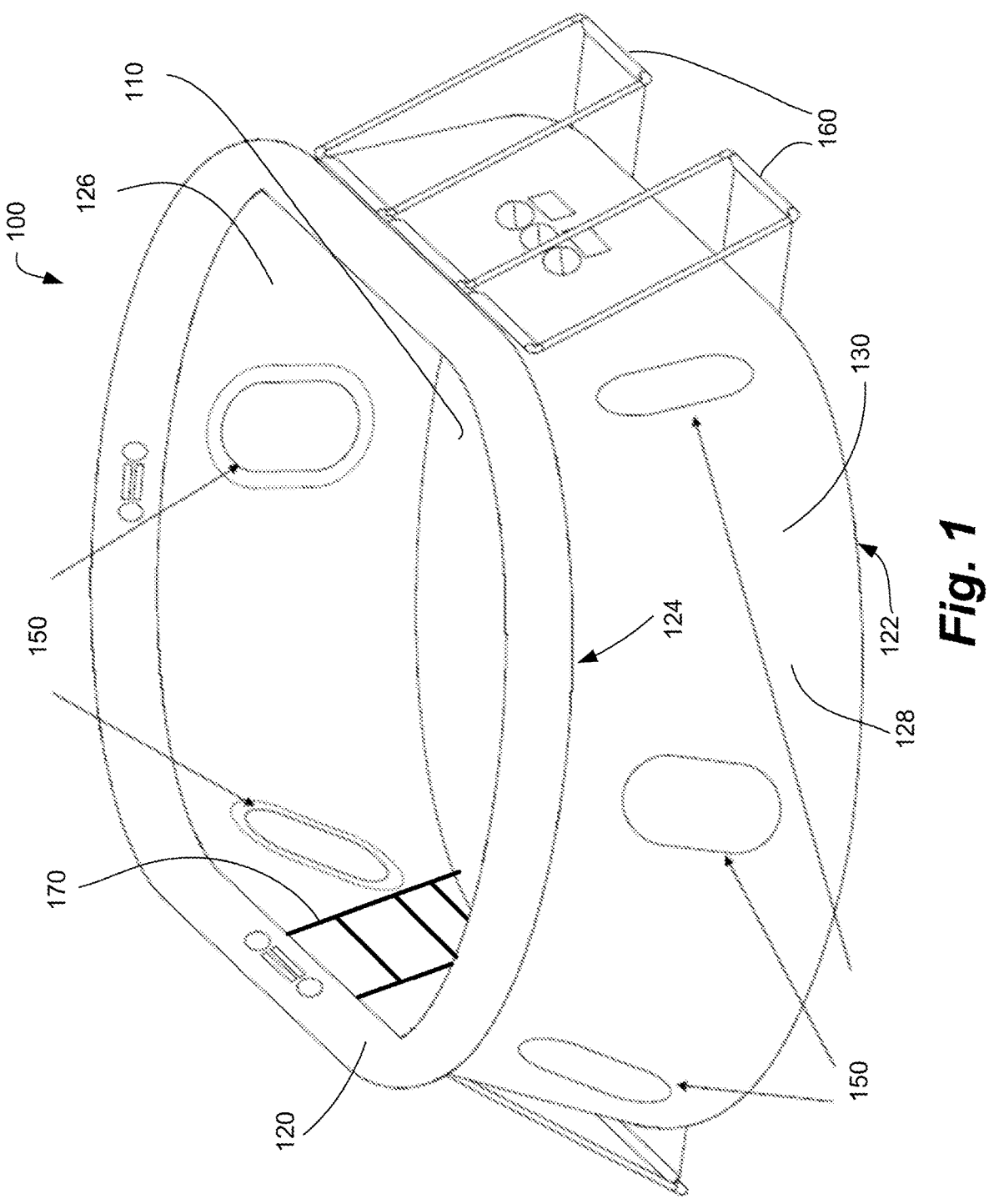
FIG. 1 is a perspective view of a container having a support element, in accordance with some embodiments of the present invention.

Although certain embodiments of the disclosure are explained in detail, it is to be understood that other embodiments are contemplated. Although embodiments of the invention are explained in detail as being systems and methods for a container with improved drainage assemblies, it is to be understood that other embodiments are contemplated, such as embodiments employing other types of containers, drains, plugs, materials, pools, and the like.

As described above, a problem with existing aboveground pools is that all pools must go through an assembly and disassembly process with every use. These processes are time-consuming, labor-intensive, and require pinpoint accuracy to ensure proper assembly. Improved methods for assembling and disassembling a pool and improving the user experience while maintaining the modularity of an aboveground pool are desirable.

A support element and/or shape retaining element may be formed from one or more support members having at least a portion coupled proximate to the side wall of the pool. For example, vertical rib supports may be used as an upward force providing member, a shape-retaining member, or both. Such vertical ribs may be formed from individual inflatable portions, or may be a foam insert, metal or polymer rod, or the like. According to some embodiments, such vertical ribs may be collapsible, being formed from collapsible inflatable portions, collapsible foam portions, or other suitable compositions. Additionally, horizontal supports may be used as a shape-retaining member or other support element.

When assembling a frame or other support element for a pool wherein the joints require insertion of the support members, a user of the pool may be required to bend or otherwise deform the frame in order to properly insert the support members and join them together. Such a process can be made quite difficult with the rigidity of the frame and as the frame nears completion.

In some embodiments, the support element can comprise a plurality of joints for joining the support members in a predetermined shape or pattern. For example, the plurality of joints can comprise T-shaped joints to join the vertical members to two or more horizontal members. As would be appreciated by one of ordinary skill in the art, while the vertical members provide an upward force, the horizontal members provide a shape-retaining force. In some embodiments, the horizontal members can be inserted in the joint. In other embodiments, the joint can be inserted in the horizontal members. A difficulty that arises with such embodiments, however, is the insertion of the last joint in the pool frame. The rigidity of the pool support element and frame provides resistance to completing the last attachment. In some embodiments, the plurality of joints can comprise at least one joint with a cutaway portion. In other words, at least one joint can be provided with a cutaway portion configured to laterally receive a horizontal member rather than the aforementioned insertion method. Such an embodiment would provide easier attachment and assembly of the support element while maintaining the structural rigidity of the pool. In some embodiments, the joint can have a cutaway notch to laterally slide a horizontal member into the joint. In other embodiments, the faces of the two receiving ends of the joint can be cutaway to laterally receive a horizontal member as opposed to insertion. In other embodiments still, the joint can be a cutaway first portion, wherein half of a joint is configured to laterally receive a horizontal member, with another second joint portion, or face plate, configured to detachably attach to the first portion to substantially enclose the horizontal member.

In some embodiments, a pool can be provided comprising a base, a side wall, and at least one transparent porthole. The transparent portholes can comprise a window sheet made of a transparent material such as PVC. The window sheets can be welded to the side wall to prevent leaks and maintain structural integrity. The transparent material can be provided such that no additional support or mesh is required. Such an embodiment would allow for an unobstructed porthole that can maintain the structural integrity of the pool without failing. In some embodiments, the entire side wall can be made from the transparent material. In other embodiments, the side wall can comprise side wall sections wherein some of the side wall sections are made from the transparent material.

In some embodiments, the pool can further comprise a drain assembly configured to fit within a drain aperture. The drain assembly can comprise a plastic material and can be welded to the side wall to prevent leaks and maintain structural integrity. In some embodiments, the drain assembly can comprise a drain hole, a drain plug member, and a locking member. The drain plug member can be configured to detachably attach to the drain hole through an interference fit in a closed position. As would be appreciated by one of ordinary skill in the art, the interference fit can be further sealed by the hydrostatic pressure of the pool, thus sealing the drain plug member in the drain hole. Additionally, the drain plug member can be configured to detachably attach to the locking member in an open position such that the drain hole remains substantially unobstructed during drainage.

In some embodiments, pools are generally formed by joining a base, along its perimeter, to an erected side wall at or near one edge of the side wall. Along the edge of the side wall and not joined to the base, either an upward force providing member or a shape retaining member, or a combination of the two, may be positioned. The upward force providing member or shape retaining member generally has at least a portion coupled proximate the end of the side wall not joined to the base (i.e., the top of the side wall). The upward force providing member may comprise a variety of different elements capable of aiding the transformation of the collapsible container from a collapsed configuration to an expanded configuration by erecting the side wall. For example, the upward force providing member might be a floating device that floats on liquid deposited in the container, causing the side wall to rise as more liquid is deposited in the container. The upward force providing member may also be a ring, such as an inflatable ring, attached to the side wall and supported by support members.

Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/ or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Figure 2:
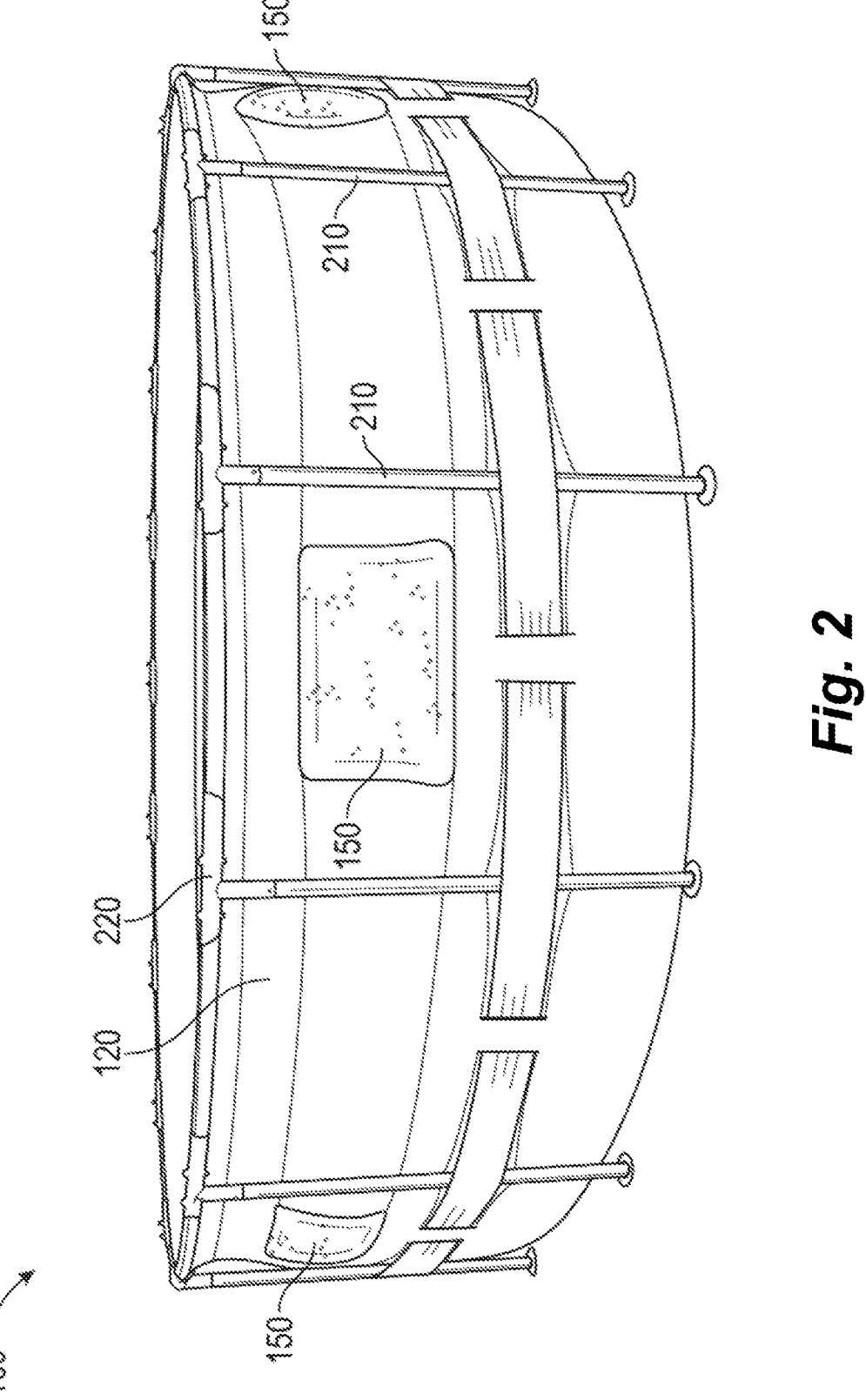
FIG. 2 is a perspective view of the exterior of a container having a support element and support members, in accordance with some embodiments of the present invention.

According to an embodiment of the invention, FIG. 1 shows a container, or swimming pool, comprising a side wall with transparent portions. As shown in FIG. 1, an above-ground swimming pool (hereinafter "pool") 100 has a base 110, a side wall 120, support members (alternatively, "structural supports," "supports," "external braces," "braces," or "frames") 160, and portholes 150. According to another embodiment of the invention, FIG. 2 shows a container, or swimming pool, comprising a side wall with transparent portions. As shown in FIG. 2, pool 100 has a base, a side wall 120, portholes 150, support members 210, and at least one joint 220.

According to some embodiments of the present disclosure, pool 100 can comprise a support element, such as a scaffold or a frame. In some embodiments, the support element can comprise a plurality of support members to provide modular assembly and disassembly of pool 100. For example, the support member can comprise a series of rods or bars that can be detachably attached to one another to form a scaffold or a frame. The support member can additionally comprise joints to join the plurality of support members together.

As shown in FIG. 2, pool 100 can comprise a support element 210 (e.g., a frame) comprising a plurality of vertical and horizontal support members. In some embodiments, the support element can maintain the structural integrity and shape of the pool. For instance, the support element can take the shape of a circular frame for use with a circular pool. In some embodiments, the support element can be configured to support a unitary sidewall 120. In other embodiments, the support element can be configured to support one or more sidewall sections. For instance, the support element can support four sidewalls of a rectangular pool. In other words, the support element can be configured to confer a desirable shape to the pool supported by the support element.

The presently disclosed support element can comprise a plurality of vertical and horizontal support members. The plurality of support members would provide for modularity, ease of storage, and quick set-up. In some embodiments, each vertical support member can be detachably attached to at least one horizontal support member by way of a joint. For example, a substantially t-shaped joint can join a vertical support member to two horizontal support members. In some embodiments, the support members can comprise rigid materials for structural integrity. For instance, the support members can be steel rods or poles, other metal or metallic alloys, PVC or other hard plastics, a combination thereof, and the like.

Figure 3B:
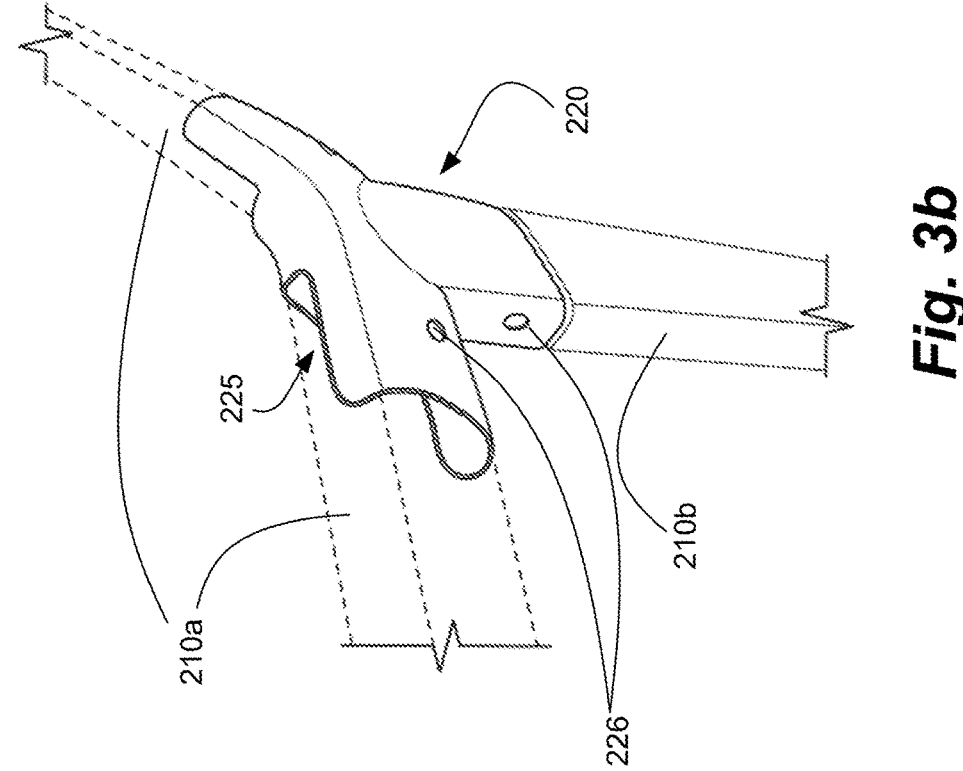
FIG. 3b is a perspective view of a joint for a pool, in accordance with some embodiments of the present invention.
Figure 3A:
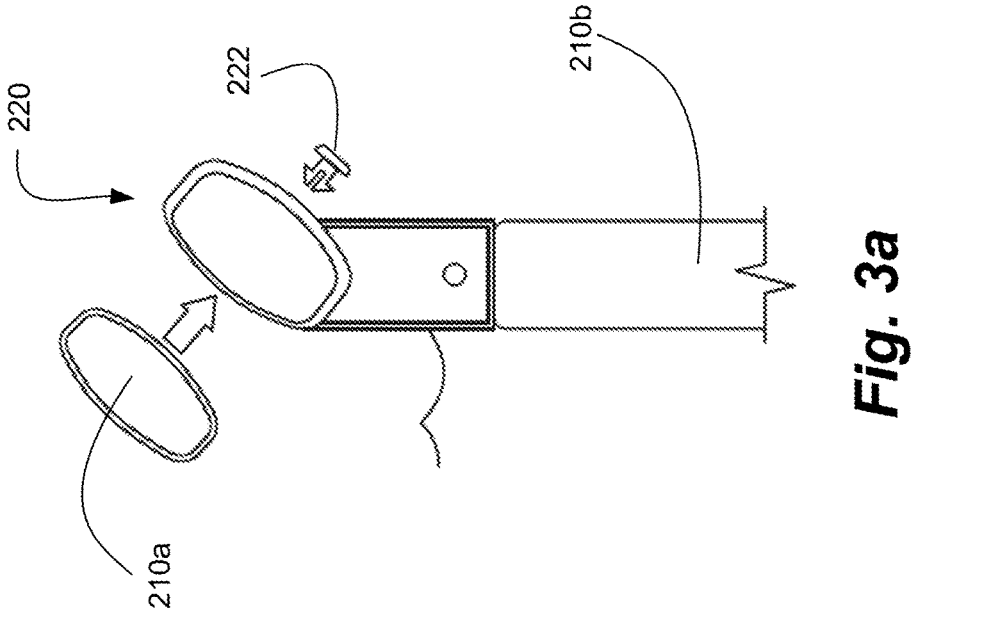
FIG. 3a is an exploded view of a joint for a pool, in accordance with some embodiments of the present invention.

Embodiments of the present disclosure can provide a joint 220 for a pool 100. In some embodiments, joint 220 can be configured to detachably attach to a vertical support member 210b (as shown in FIGS. 3A and 3B). In some embodiments, joint 220 can additionally be configured to detachably attach to two or more horizontal support members 210a (as shown in FIGS. 3A and 3B). In some embodiments, joint 220 can be configured to connect to support members 210 by inserting support members 210 into joint 220. In other words, joint 220 can be configured to receive support members 210. In such an embodiment, support members 210 may be detachably attached to joint 220 through a friction fit or interference fit. Alternatively, support members 210 and joint 220 may have holes 226 (as shown in FIGS. 3A and 3B) configured to align and receive a fastening pin 222 (as shown in FIGS. 3A and 3B) or other such device when aligned. While some embodiments can provide joint 220 configured to receive support members 210 via insertion, some embodiments can provide joint 220 with at least a cutaway portion 225 (as shown in FIGS. 3A and 3B) to laterally receive at least one support member 210. In some embodiments, joint 220 can still receive vertical support member 210b via insertion but can laterally receive at least one horizontal support member 210a. For instance, vertical support member 210b can be inserted into joint 220 along with a first horizontal support member 210a, while a second horizontal support member 210a is laterally received by joint 220. Alternatively, joint 220 can laterally receive two or more horizontal joints 210a. As would be appreciated by one of ordinary skill in the art, such embodiments remove the need for insertion into joint 220, which can be made difficult by the large size and weight of the support element or frame and the rigidity of the support members.

In some embodiments, the at least a cutaway portion 225 can comprise two ends with open faces, as depicted in FIGS. 3a and 3b. The open faces can be configured to laterally receive the horizontal support members 210a. In some embodiments, the joint 220 can still insertably receive a vertical support member 210b, as shown. Additionally, the joint 220 can further comprise a fastening pin 222 or other such device to fasten the horizontal support members 210a to the joint 220 when aligned. Such an embodiment would provide for no need to struggle with inserting the rigid horizontal support members 210a, which can become difficult as the frame becomes assembled.

Figure 4B:
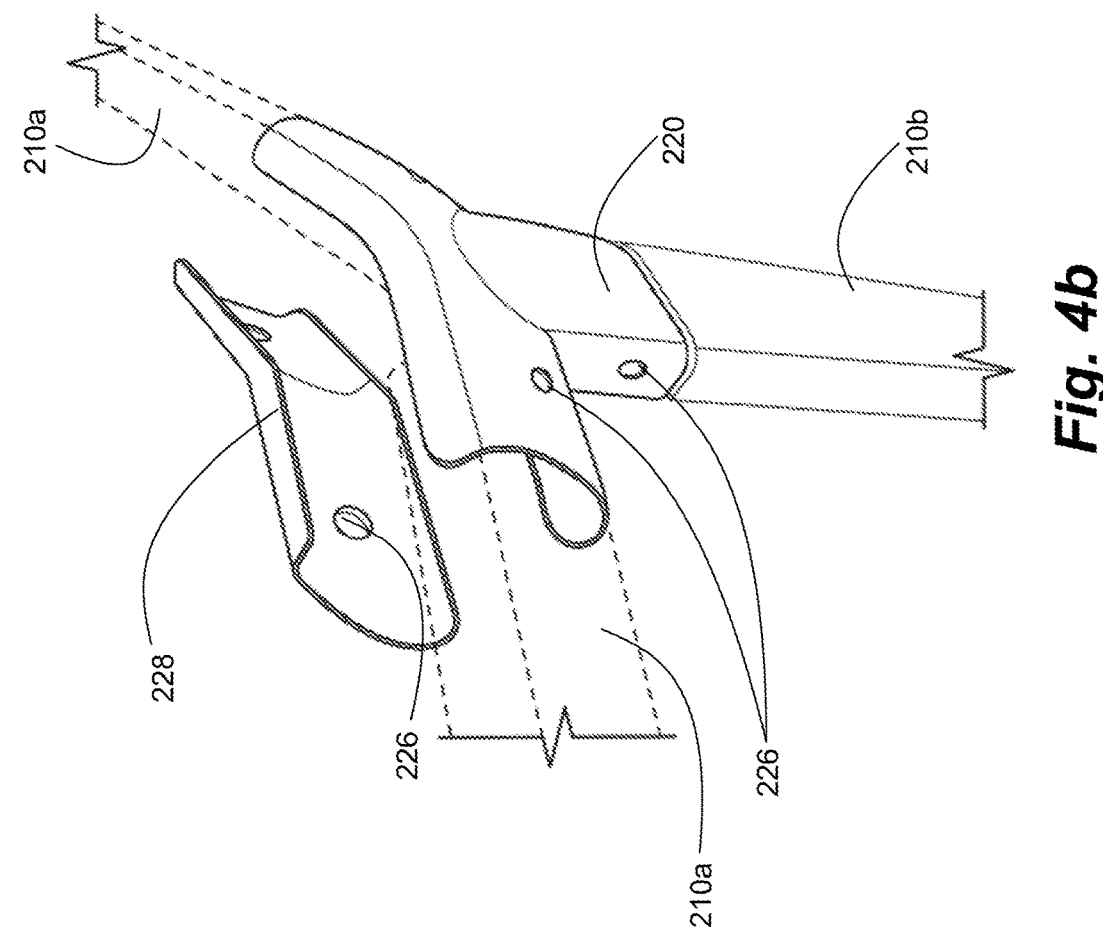
FIG. 4b is a perspective view of a joint for a pool, in accordance with some embodiments of the present invention.
Figure 4A:
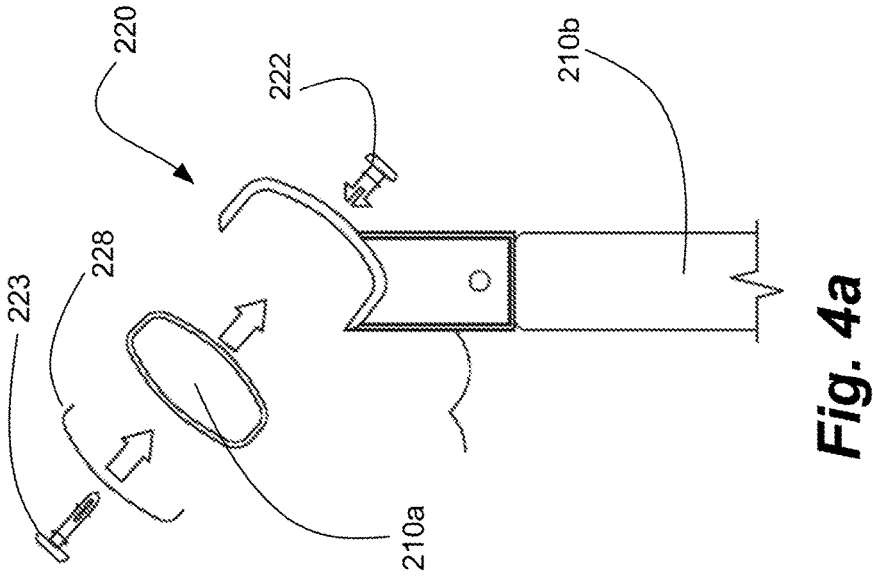
FIG. 4a is an exploded view of a joint for a pool, in accordance with some embodiments of the present invention.

In some embodiments, the at least a cutaway portion 225 can be configured such that the whole joint has an open face, as depicted in FIGS. 4a and 4b. The open face can be configured to laterally receive the horizontal support members 210a. In some embodiments, joint 220 can still insertably receive a vertical support member 210b, as shown. Additionally, joint 220 can further comprise a first fastening pin (or device) 222 or other such device to fasten horizontal support members 210a to joint 220 when aligned. In some embodiments, joint 220 can further comprise a face plate 228 configured to detachably attach to joint 220 and enclose horizontal support members 210a. In other words, face plate 228 can sandwich horizontal support members 210a between face plate 228 and joint 220. Such an embodiment can provide the same security as inserting horizontal members 210a into joint 220 while maintaining the ease of laterally receiving support members 210. In some embodiments, joint 220 can further comprise a second fastening pin 223 or other such device to fasten face plate 228 to horizontal support members 210a. In some embodiments, second fastening pin 223 can be configured to detachably attach to first fastening pin 222.

Figure 5:
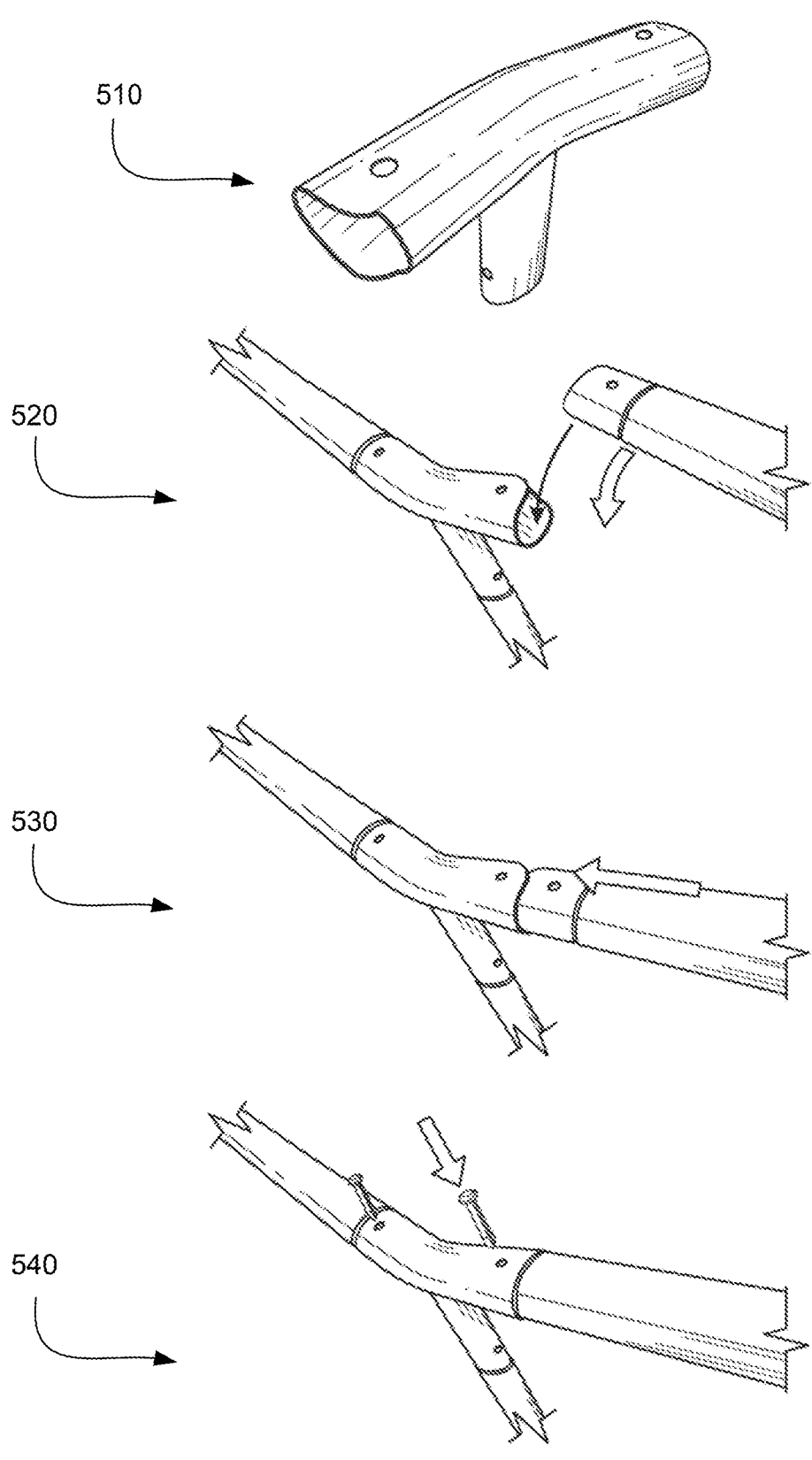
FIG. 5 is a perspective view of a joint and support members for a pool, in accordance with some embodiments of the present invention.
Figure 7:
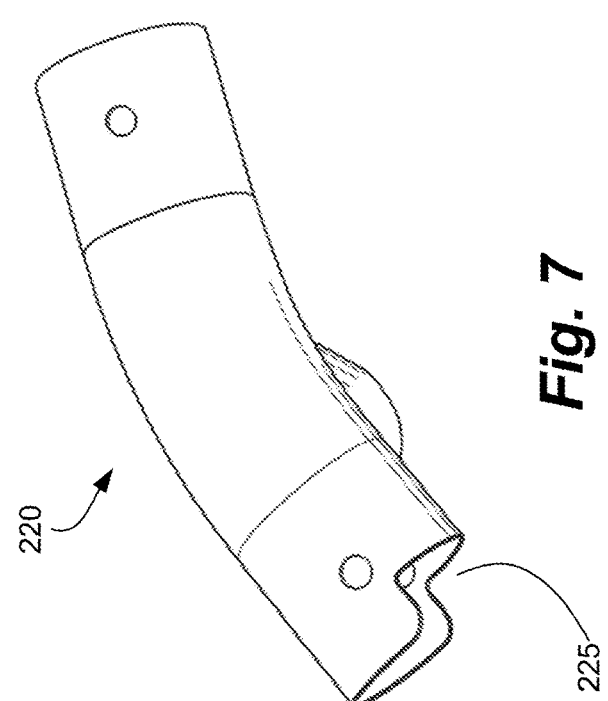
FIG. 7 is a top-down view of a joint for a pool, in accordance with some embodiments of the present invention.
Figure 6:
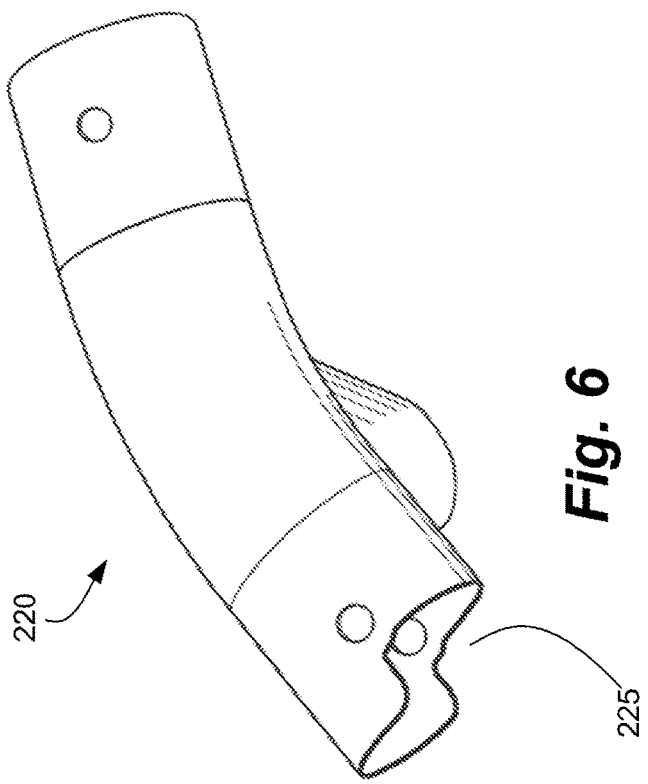
FIG. 6 is a top-down view of a joint for a pool, in accordance with some embodiments of the present invention.

In some embodiments, the at least a cutaway portion can comprise a cutaway notch 225, as depicted in FIGS. 5-7. Cutaway notch 225 can be configured to laterally receive at least one horizontal support member 210a. In some embodiments, joint 220 can comprise an enclosed portion for inserting a horizontal support member 210a, in addition to cutaway notch 225 for laterally receiving a horizontal support member 210a, as shown in FIG. 5. In some embodiments, joint 220 can still insertably receive a vertical support member 210b, as shown. Additionally, joint 220 can further comprise at least one fastening pin 222 or other such device to fasten horizontal support members 210a to joint 220 when aligned. Cutaway notch 225 can be configured in a variety of shapes and sizes as desired to increase the ease of assembling the pool, as shown in FIGS. 6 and 7. As would be appreciated by one or ordinary skill in the art, such an embodiment would provide the ease of lateral receiving of horizontal members 210a combined with the security of inserting horizontal members 210a into joint 220. Cutaway notch 225 can be cut such that minimal bending or deformation of the support element is required to insert the at least one horizontal support member 210a into joint 220.

As shown in the Figures, the presently disclosed joints 220 can comprise at least a cutaway portion 225, such as a cutaway notch in FIG. 3b or an entire open face as in 4b. Such embodiments increase the ease of assembly, and specifically remove the need to twist or otherwise deform the pool frame to insert the support members into joints. In some embodiments, joint 220 can comprise a face plate 228 to enclose horizontal members 210a such that horizontal members 210a are enclosed as if inserted into the joint. Other means may be used to mimic the security of insertion while maintaining the ease of laterally receiving a support member, such as a cutaway notch 225 leading to an insertable portion of the joint.

In other embodiments, the at least a cutaway portion 225 can comprise a retractable portion configured to expose an open face of the joint to laterally receive at least one horizontal support member 210a. In some embodiments, the retractable portion can be spring loaded and configured to be depressed by a horizontal support member 210a and revert to an original position to substantially enclose the horizontal support member 210a. In some embodiments, joint 220 can comprise a hinged face plate configured to swing open to allow a horizontal support member 210a to be received by an open face of joint 220. Additionally, the hinged face plate can swing closed to secure horizontal support member 210a to joint 220.

In some embodiments, fastening pin 222 or other such device can be removed from joint 220 and any other adjoining pieces. For instance, fastening device 222 can be a pin inserted into fastening holes 226 by the user when support members 210 are aligned with joint 220, as shown in FIGS. 3a and 5. In some embodiments, fastening device 222 can comprise multiple pieces or can fasten different components or other fastening devices. For example, in FIG. 4a, a first fastening device 222 can be inserted by a user to fasten a support member 210 to joint 220 followed by a second fastening device 223 to fasten a face plate 228 to support member 210a. Additionally, face plate 228 can be fastened to joint 220 by attaching second fastening device 223 to first fastening device 222. In some embodiments, fastening pin 222 or other such device can be interconnected with joint 220 and configured to engage with a horizontal support member 210a or other adjoining pieces (such as a face plate 228) upon laterally receiving said components. For example, a fastening pin 222 can be attached to joint 220 and spring loaded such that, after laterally receiving a horizontal support member 210a in a cutaway notch 225 and insertion into joint 220 (as shown in FIG. 5), fastening pin 222 depresses to receive horizontal support member 210a and pops up into fastening holes 226 when horizontal support member 210a is aligned with joint 220. In some embodiments, fastening pin 222 or other such device can be spring loaded in a depressed position to receive support members 210 and pushed into an engaged position by the user when support members 210 are aligned with joints 220. In some embodiments, fastening device 222 can be interconnected with support members 210 such that each support member 210 is configured to fasten itself to a joint 220. For example, support members 210 can comprise spring loaded pins configured to pop into fastening holes 226 when aligned with joints 220.

Figure 8A:
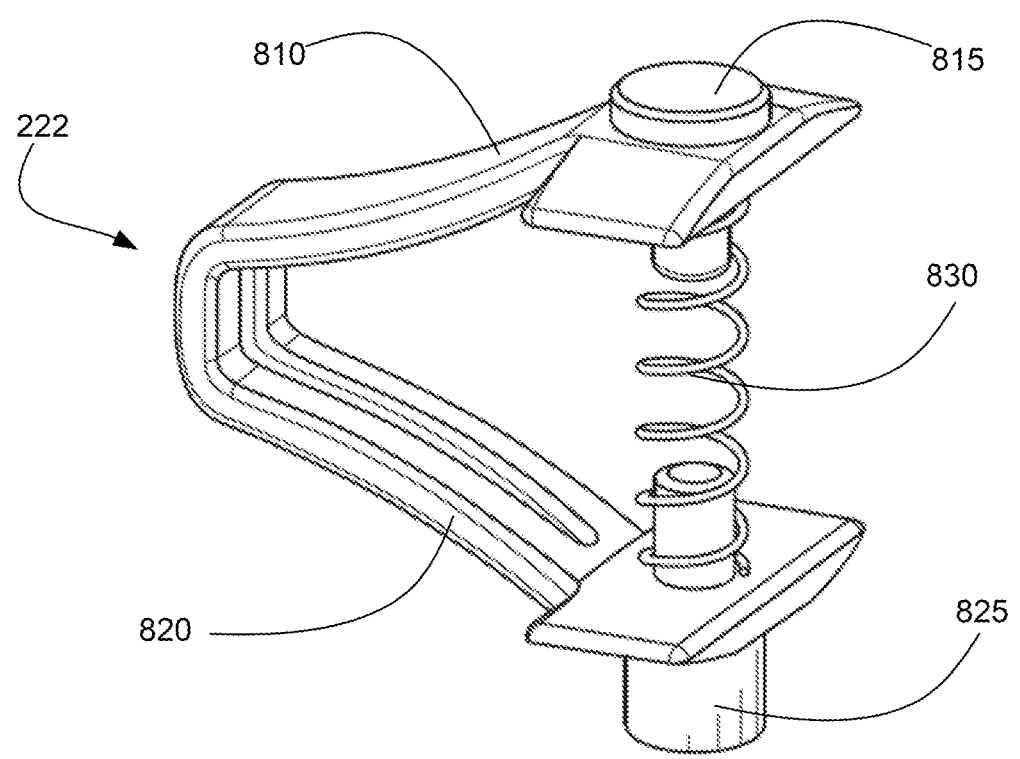
FIG. 8a illustrates a fastening pin in accordance with some embodiments of the present invention.
Figure 8B:
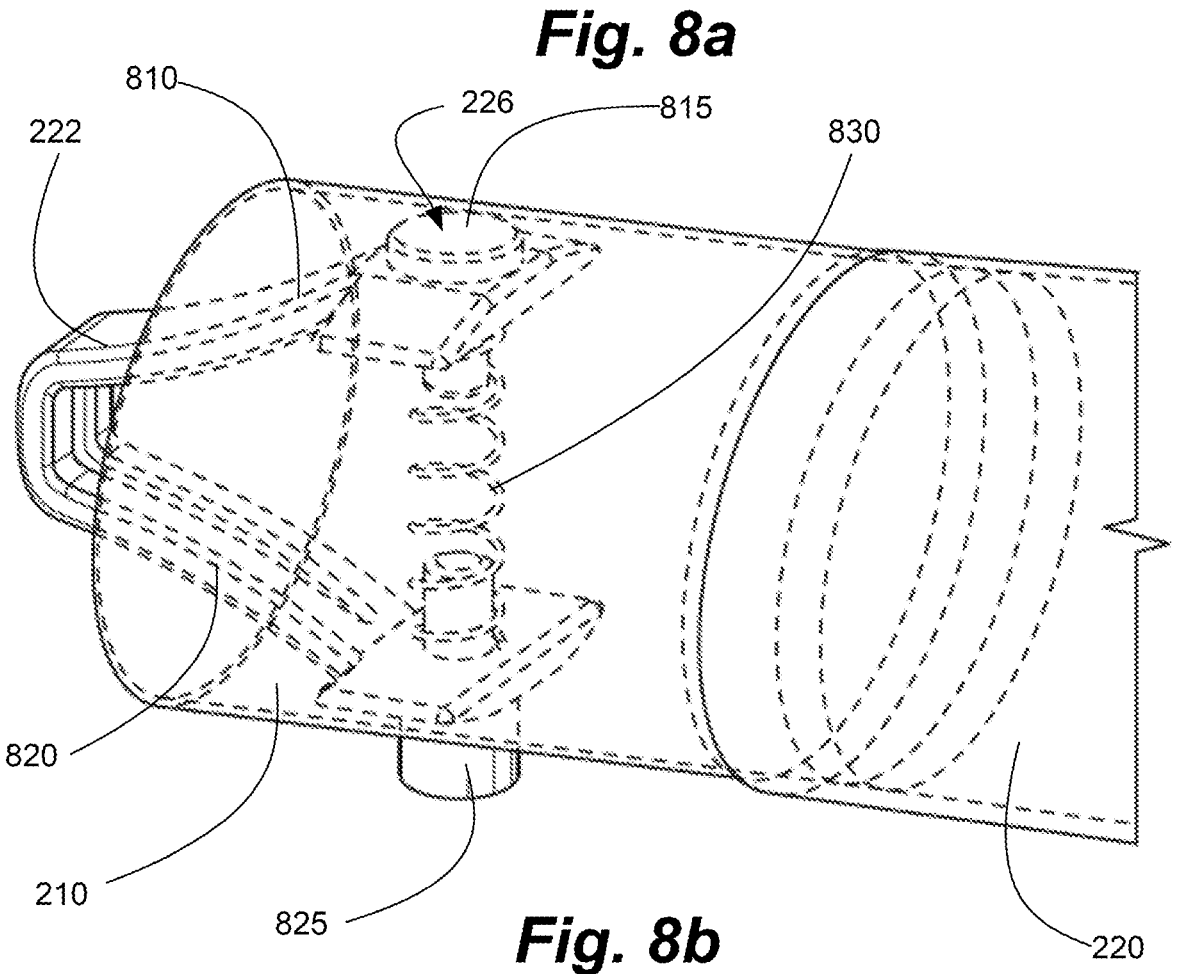
FIG. 8b illustrates another fastening pin in accordance with some embodiments of the present invention.

Additional exemplary embodiments of fastening device 222 are shown in FIGS. 8a and 8b. As shown, fastening device 222 can comprise an upper wing 810, a lower wing 820, and a spring 830. In some embodiments, fastening device 222 can be configured to flex from a first (i.e., neutral) position to a second inward position to clear a joint 220 or a support member 210 and then return to the neutral position where each is held in place. In such an embodiment, upper wing 810 and lower wing 820 may flex towards each other. Fastening device 222 can further comprise an upper notch 815 disposed on upper wing 810, and a lower notch 825 disposed on lower wing 820. With upper wing 810 and lower wing 820 flexed towards each other, such a position can allow for the passing of upper notch 815 and lower notch 825 into joint 220 or support member 810. When in use, the spring action of fastening device 222 can be twofold, provided by spring 830 and the flexing of the wings. When inserted into joint 220 or support member 810, the spring action of fastening device 222 can return fastening device 222 to the first (i.e., neutral) position wherein upper notch 815 and lower notch 825 are aligned with and received by fastening holes 226. It is understood that the spring action of fastening device 222 can be achieved through only using one of the flexing of the wings and spring 830. Additional methods of providing a spring-like force can be used, so long as fastening device 222 is operable to return to a first position when aligned with joint 220 or support members 210.

In some embodiments, upper wing 810 and/or lower wing 820 can further comprise contouring to match the curve of joint 220 or support member 210 when inserted. Such an embodiment would provide a smooth and robust interface between fastening device 222 and whichever member it was inserted into. Additionally, upper notch 815 can be configured to not protrude through fastening holes 226. As shown in FIG. 8b, upper notch 815 can remain flush with fastening holes 226 without sticking out of the joint assembly. Alternatively, a support member (e.g., 210a) may be provided without a fastening hole (e.g., fastening hole 226) through the top surface and instead may include a notch on the interior surface of the support member for receiving upper notch 815. As would be appreciated by one of ordinary skill in the art, such embodiments would increase the safety of the user when grabbing onto the pool frame, reduce the risk of the sidewall material to be caught or tear on a protruding piece, and increase the overall aesthetics of the pool.

Embodiments of the present disclosure can provide a method for assembling an above ground pool, as shown in FIG. 5. As shown in step 510, at least one joint can be provided comprising at least a cutaway portion. In step 520, a first horizontal support member can be inserted into the joint while a second horizontal support member can be laterally received by the at least a cutaway portion. In step 530, the second horizontal support member can be pushed into the joint after the lateral receiving such that the second horizontal support member is enclosed in the joint as if it were inserted into the joint. In step 540, one or more fastening pins or other such devices can be inserted into holes in the joint and/or the horizontal support members to fasten the horizontal support members to the joint. Additionally, the holes can indicate to a user of the pool that the horizontal support members are properly aligned with the joint.

Pool 100 may be made in a variety of shapes, including, but not limited to, circular, as shown in FIG. 2, elliptical, as shown in FIG. 1, rectangular, square, oblong, oval-shaped, rectangular with rounded corners, and the like. Thus, it will be apparent to one skilled in the art that the configuration of pool 100 may be many shapes. Additionally, pool 100 may be made in a variety of sizes. The varied sizes and shapes of pool 100 may result in pool 100 having more than one side wall 120 forming the perimeter of pool 100.

Pool 100 may be a frame pool, as shown in FIGS. 1 and 2, or a pop-up type of pool, both of which are collapsible in nature. The pop-up pool is adapted to rise with the amount of water inserted into pool. In some embodiments, a pop-up pool 100 may also be outfitted with external braces or frames 160 for additional support. The frame pool is typically pre-fabricated and includes a plurality of external vertical braces or frames for supporting the frame pool above the ground. As shown in FIGS. 1 and 2, a frame pool 100 may comprise external vertical braces and top braces. As one skilled in the art would appreciate, other types of pools may be used with the present invention.

As previously discussed, pool 100 is formed from a base 110 and at least one side wall 120. Base 110 and side wall 120 may be formed from multiple varied materials. Base 110 and side wall 120 may be formed of the same material or different materials, and in embodiments involving more than one side wall 120, each side wall 120 may be formed of the same or different materials. For example, in some embodiments, base 110 and side wall 120 of pool 100 may be formed from a natural textile (e.g., burlap, jute, etc.) or synthetic material (e.g., plastic, polyurethane, PVC, nylon, etc.). In some embodiments, base 110 may be formed from a natural textile and side wall 120 may be formed of a synthetic material. Many materials (especially water-permeable textiles, etc.) may be used to construct a pool; the materials, however, should be treated to retain water. For example, such materials could be adhered to, laminated with, coated with, or bonded to a material impermeable to water. In accordance with some embodiments, base 110 may be formed from a nylon shell, which may be laminated or otherwise treated to hold water. For example, the nylon shell might be bonded to another material, such as a polyurethane, PVC, vinyl, or other suitable impermeable lining to provide the desirable waterproof qualities, and to provide a more pleasing tactile quality to the interior of pool 100. Similarly, the wall 120 of pool 100 may be constructed from these materials, or other materials having similar suitable qualities. Many of the materials that are used may be selected for their durability.

For example, base 110 may be formed from materials that are more durable than the side wall 120, as this section of pool 100 would likely be subjected to more wear than that experienced by side wall 120. Also, as described, base 110 and side wall 120 may be formed from a combination of materials, which may be adhered or bonded together. The materials used for the various portions of pool 100, including, for example, base 110 and side wall 120, may be joined by way of a number of commonly known suitable techniques, such as sewing, adhesives, bonding, lamination, RF welding, other suitable joining techniques, and the like. The connection of base 110 to side wall 120 may be along the bottom 122 of side wall 120. Base 110 can include a perimeter, wherein side wall 120 may be connected about the perimeter of base 110.

In some embodiments, side wall 120 may include an inner wall 126 and an outer wall 128. Inner wall 126 may be sealable to outer wall 128 by welding, adhesives, or the like. Side wall 120 may be inflatable or non-inflatable. Further, side wall 120 may be non-spring activated. In some embodiments, side wall 120 can further comprise a drain aperture. The drain aperture can pass through inner wall 126 and outer wall 128 providing an outlet for fluid to flow out of the container. In some embodiments, base 110 can comprise a drain aperture to provide an outlet for fluid to flow out of the container. In some embodiments, the drain aperture can be cut from an area between side wall 120 and base 110. In some embodiments, the bottom 122 of side wall 120 can comprise the drain aperture.

In some embodiments, a large portion of side wall 120 may be transparent in nature. Such a portion would be larger than portholes 150 and would comprise a portion or all of side wall 120 itself. In some embodiments, half of side wall 120 may be transparent in nature. In some embodiments, the entire side wall 120 may be transparent. It is desirable to consumers for side walls 120 to have a substantial portion being transparent, as they enable a significantly larger viewing area, enabling a view into or out of the pool.

In some embodiments, side wall 120, having a substantial portion being transparent, may comprise a clear window sheet attached between a clear inner wall 126 and a clear outer wall 128. In some embodiments, multiple clear window sheets, of sufficient size, may be welded together to form a unified side wall 120. In some embodiments, a single clear window sheet, of sufficient thickness, may form a unified side wall 120. In some embodiments, the unified side wall 120, having a substantial portion being transparent, takes the place of side wall 120 with portholes 150, with all other components of pool 100 attaching to side wall 120 as described elsewhere in this disclosure. In some embodiments, side wall 120 can comprise a plurality of side wall sections (e.g., two or more side wall sections). In some embodiments, multiple clear window sheets, of sufficient size, may be welded together to form a side wall section. In some embodiments, some side wall sections can be transparent while other side wall sections can be solid. For example, the side wall sections can alternate between transparent and solid or be arranged in any other pattern. As would be appreciated by one of ordinary skill in the art, such an embodiment would provide greater transparency than simply having portholes and provide another level of user customization to arrange the transparent side walls sections as desired.

As shown in FIGS. 1-2, pool 100 may comprise a porthole 150, or a plurality thereof. Portholes 150 may be similar to a window permitting one to see into pool 100 or out of pool 100. Portholes 150 may further enable one to determine the level of liquid within pool 100.

As also shown, for example, in FIGS. 1 and 2, portholes 150 may be of a particular shape. In some embodiments, the shape of portholes 150 may be determined by the shape of apertures cut into walls 126, 128 of pool 100. As shown in FIG. 1, the shape of portholes 150 may be elliptical or substantially elliptical. As shown in FIG. 2, in some embodiments, the shape of portholes 150 may be circular or substantially circular. As shown in FIG. 2 additionally, in some embodiments, the shape of portholes 150 may be substantially rectangular with rounded corners. As will be apparent to one skilled in the art, however, portholes 150 may be many shapes, such as square, rectangular, oblong, and the like. In some embodiments, as shown in FIGS. 1 and 2, portholes 150 may be spaced evenly about side wall 120.

Portholes 150 may comprise a generally transparent window sheet that is attached to side wall 120 (or inner wall 126). The window sheet may be attached to side wall 120 by welding the window sheet to side wall 120 with one or more welds. In some embodiments, the welds may be made around the circumference of the aperture cut into side wall 120 and may have substantially the same shape as the aperture. The welds may be continuous welds, which may help prevent the fluid in pool 100 from leaking. Successive welds may be concentric and further extend from the center of the aperture in side wall 120. Specifically, there may be two welds, three welds, four welds, five welds, or more, moving outward from the center of the aperture in side wall 120. The successive welds may aid in reinforcing porthole 150 to make it more durable than known portholes. That is, since there may be a plurality of welds, if one weld fails, the other welds may maintain the integrity of porthole 150 and thus pool 100.

Alternatively, or additionally, the window sheet may be attached to side wall 120 by using an adhesive substance.

The window sheet may be substantially similar in shape to the aperture in side wall 120, but it may also be of a different shape. If the window sheet is a different shape than the aperture it covers, the window sheet may still be attached by welding or adhesive, however the welds need not be concentric. For example, there may be a weld near the outer edge of the window sheet, and a second weld closer to and surrounding the aperture in the wall.

In some embodiments, the window sheet is attached to side wall 120 by securing it between inner wall 126 and outer wall 128. In such an embodiment, welding or adhesives may be used in a manner similar to that discussed above.

In some embodiments, the window sheet may comprise a clear flexible polymer, such as flexible PVC. In some embodiments, side wall 120 (or inner wall 126) may also be a flexible polymer, such as flexible PVC. The use of two similar materials may make attaching the window sheet and side wall 120 easier and also increase the strength of the attachment. Specifically, in some embodiments, such as embodiments employing high frequency welding (or RF welding) to form one or more welds, it is desirable to have materials with similar melting points and chemical compositions to form a stronger weld and make the welding process less complex.

In some embodiments, a porthole 150 may further include two additional components. Porthole 150 may comprise a clear window sheet attached to side wall 120 of the pool. In some embodiments, the window sheet may be attached to inner wall 126 or outer wall 128 of side wall 120 of pool 100. Moreover, the window sheet may be attached between inner wall 126 and outer wall 128. In other words, the window sheet may be "sandwiched" to and between inner wall 126 and outer wall 128, and attached to both walls by conventional means, such as by a weld, adhesive, or the like. In some embodiments, therefore, the shape of porthole 150 may be determined by the shape of the apertures cut into walls 126, 128.

The window sheet can comprise a plastic material such as PVC. The window sheet can further comprise a plasticizer material. As would be appreciated by one of ordinary skill in the art, the addition of a plasticizer would reduce the brittleness of the pure PVC material and increase the overall material strength of the window sheet. The addition of a plasticizer would increase the flexibility and durability of the window sheet. Such an embodiment can provide numerous advantages, such as retaining structural integrity and resisting rupture while being a flexible and easily collapsible material. In other words, the window sheets may be bent, flexed, and strained during storage and packaging, but will remain robust and structurally sound when the pool is filled and in use.

In some embodiments, portholes 150 may aid in safety, as portholes 150 may enable improved viewing into pool 100 through side wall 120. As would be appreciated by one of ordinary skill in the art, such an embodiment would be improved provided the window sheets in the portholes were sufficiently strong to not require a wire mesh or any reinforcing material. For example, the window sheet in portholes 150 can comprise a plastic material and a plasticizer to provide sufficient strength to eliminate the need for a mesh or reinforcing material. If portholes 150 are removably designed by suitable means, a porthole 150 may also be used as a drainage device, enabling quick emptying of the liquid of pool 100. Thus, portholes 150 may be integrally formed during manufacturing of side wall 120, or may be removable, wherein the various sheets are removably attached via a waterproof and leak-proof method. Portholes 150, however, may also be attached via a non-removable method.

Pool 100 may further include a pump device. The pump device can be adapted as a circulation system and, beneficially, a cleaning system. The pump device can comprise a first tube coupling a suction port of the pump in fluid communication with a main drain or mobile cleaning device which draws water and settled debris from the bottom of the pool. The pool pump may further comprise a second tube to a coupling device which diverts a small portion of pool "return" water pumped from an outlet port of the pump. Further, the pump may be adapted to provide a jet of air bubbles in the water, for a Jacuzzi or spa effect.

FIG. 1 illustrates pool 100 having a brace or structural support 160. Support 160 may include vertical rib supports and may be coupled proximate to side wall 120 of pool 100. For example, support 160 may be inserted within the material making up side wall 120. The support members may comprise at least a portion of flotation device 110 or a support member and may have at least a portion coupled to the top of side wall 120 and vertically along side wall 120 to provide buoyancy and/or rigidity to side wall 120. Support members 160 may comprise, for example, one or more inflatable bladders, collapsible foam, removable support members, or the like.

One skilled in the art would appreciate that support members 160 may be used on a frame pool, as well as a pop-up pool for supporting the pool above the ground. In some embodiments, support members 160 are positioned outside pool 100.

Pool 100 may include a ladder 170 (as shown in FIG. 1) to enable one to enter and/or exit pool 100. Ladder 170 may be integral with brace 160, or not. Ladder 170 may further be insertable into pool 100, enabling one to exit pool 100. Because a rim of pool 100 is above the ground, ladder 170 is preferably flush with the rim for easy entry/exit from pool 100.

Because pool 100 is collapsible, the liquid in pool 100 should be drainable. Preferably, a drainage assembly is integral with pool 100. In some embodiments, the drainage assembly can be a cork or like device, that is removeable from pool 100, such that, when removed the water from pool 100 may be drained. The drainage assembly may also be a valve enabling control of draining pool 100. One skilled in the art would appreciate that the drainage assembly may be many devices enabling easy draining of pool 100, safely and environmentally. The drain assembly may also comprise a hard or soft plastic material and can be disposed substantially within a drain aperture in side wall 120.

In some embodiments disclosed herein, the drain assembly can be disposed on a side wall 120 of the pool and can substantially surround a drain hole aperture formed in a side wall 120. In some embodiments, the drain assembly can be disposed on a base 110 of the pool. In some embodiments, the drain assembly can be disposed on a bottom 122 of the side wall 120. In some embodiments, the drain assembly can be disposed on an area substantially between side wall 120 and base 110.

In some embodiments, the drain can comprise a drain plug member and a locking member. In some embodiments, the drain plug member can be configured to detachably attach to the drain hole in a closed position. Additionally, the drain plug member can be configured to detachably attach to the locking member in an open position. In other words, the open position can provide for the drain hole remaining substantially unobstructed by the drain plug member during the draining process.

In some embodiments, one or more welds may be used to secure the drain assembly to side wall 120 or between inner wall 126 and outer wall 128. The welds may be made around the perimeter of the aperture in side wall 120. In some embodiments, a plurality of welds can be employed. These welds may be oriented in any way sufficient to provide a water tight seal. In some embodiments, the welds may be arranged in a concentric manner around the aperture in side wall 120. This arrangement allows one or more of welds to fail, while still retaining a water tight seal around the drain assembly. The drain assembly can be joined to another part of the pool, such as side wall 120, by way of a number of commonly known suitable techniques, such as sewing, adhesives, bonding, lamination, RF welding, other suitable joining techniques, and the like.

An embodiment of the present disclosure can be implemented according to at least the following:

Clause 1: An above-ground pool comprising: a base; at least one sidewall defining the entire pool area and joined to the base; and a support element comprising: two horizontal support members; a vertical support member; and a joint configured to join at least the two horizontal support members through insertion, wherein the joint comprises a cutaway portion configured to laterally receive at least one of the two horizontal support members.

Clause 2: The above-ground pool of Clause 1, the support element further configured to keep the at least one sidewall elevated off the ground.

Clause 3: The above-ground pool of Clause 1, wherein the at least one sidewall is a unitary sidewall formed from a single sheet.

Clause 4: The above-ground pool of Clause 1, wherein the base is rectangular, rectangular with rounded corners, square, square with rounded corners, circular, oval, oblong, elliptical, triangular, pentagonal, hexagonal, octagonal, or decagonal.

Clause 5: The above-ground pool of Clause 1, wherein the at least one sidewall and base comprise polyurethane, PVC, nylon, vinyl, or a textile coated with a material impermeable to water.

Clause 6: The above-ground pool of Clause 1, wherein, when the above-ground pool is in an installed state, a first end of the vertical support member abuts a surface supporting the above-ground pool.

Clause 7: The above-ground pool of Clause 1, wherein the joint is further configured to receive at least one vertical support member from the vertical support member.

Clause 8: The above-ground pool of Clause 1, further comprising a set of fastening pins connecting the joint and the two horizontal support members.

Clause 9: The above-ground pool of Clause 1, further comprising a set of fastening pins connecting the joint and the vertical support member.

Clause 10: The above-ground pool of any of Clauses 8 or 9, wherein each fastening pin of the set of fastening pins comprises: an upper wing; a lower wing; and a spring attached to the upper wing and the lower wing and attaching thereto, wherein the upper wing and the lower wing are capable of flexing toward one another such that the fastening pin has an inward position, and wherein the spring is configured to push the upper wing and the lower wing away from one another such that the fastening pin has a neutral position.

Clause 11: The above-ground pool of Clause 10, wherein the upper wing has an upper notch and the lower wing has a lower notch, and wherein the upper notch and the lower notch are configured to be inserted through a first set of apertures in the joint and a second set of apertures in the two horizontal support members.

Clause 12: The above-ground pool of Clause 10, wherein the upper wing and the lower wing are contoured to match the shape of the two horizontal support members such that the upper wing and the lower wing are configured to be flush with an interior surface of the two support members when inserted.

Clause 13: The above-ground pool of Clause 1, wherein the two horizontal support members and the vertical support member are selected from the group consisting of a flexible pole, a rod, and a bar.

Clause 14: An above-ground pool comprising: a base; at least one sidewall that, when in a deployed configuration, defines an interior volume of the above-ground pool and joined to the base; and a support element comprising: two horizontal support members; a vertical support member; a joint configured to receive and join the vertical support member; and a face plate detachably attachable to the joint such that an end of each of the two horizontal support members can be secured between the face plate and the joint when the face plate is detachably attached to the joint.

Clause 15: The above-ground pool of Clause 14, the support element further configured to keep the at least one sidewall elevated off the ground.

Clause 16: The above-ground pool of Clause 14, wherein the at least one sidewall is a unitary sidewall formed from a single sheet.

Clause 17: The above-ground pool of Clause 14, wherein the base is rectangular, rectangular with rounded corners, square, square with rounded corners, circular, oval, oblong, elliptical, triangular, pentagonal, hexagonal, octagonal, or decagonal.

Clause 18: The above-ground pool of Clause 14, wherein the at least one sidewall and base comprise polyurethane, PVC, nylon, vinyl, or a textile coated with a material impermeable to water.

Clause 19: The above-ground pool of Clause 14, wherein, when the above-ground pool is in an installed state, a first end of the vertical support member abuts a surface supporting the above-ground pool.

Clause 20: The above-ground pool of Clause 14, further comprising a set of fastening pins connecting the joint and the two horizontal support members.

Clause 21: The above-ground pool of Clause 14, further comprising a set of fastening pins connecting the joint and the vertical support member.

Clause 22: The above-ground pool of any of Clauses 20 or 21, wherein each fastening pin of the set of fastening pins comprises: an upper wing; a lower wing; and a spring attached to the upper wing and the lower wing and attaching thereto, wherein the upper wing and the lower wing are capable of flexing toward one another such that the fastening pin has an inward position, and wherein the spring is configured to push the upper wing and the lower wing away from one another such that the fastening pin has a neutral position.

Clause 23: The above-ground pool of Clause 22, wherein the upper wing has an upper notch and the lower wing has a lower notch, and wherein the upper notch and the lower notch are configured to be inserted through a first set of apertures in the joint, a second set of apertures in the faceplate, and a third set of apertures in the two horizontal support members.

Clause 24: The above-ground pool of Clause 22, wherein the upper wing and the lower wing are contoured to match the shape of the two horizontal support members such that the upper wing and the lower wing are configured to be flush with an interior surface of the two support members when inserted.

Clause 25: The above-ground pool of Clause 14, wherein the two horizontal support members and the vertical support members are selected from the group consisting of a flexible pole, a rod, and a bar.

Clause 26: A frame joint for an above-ground pool, the frame joint configured to receive two support members for the above-ground pool, the frame joint comprising: a first cutaway portion on a first end of the joint, the first cutaway portion (i) configured to laterally support a first support member of the two support members and (ii) comprising a first set of apertures configured to align with a set of apertures in the first support member; a second cutaway portion on a second end of the joint, the second cutaway portion (i) configured to laterally support a second support member of the two support members and (ii) comprising a second set of apertures configured to align with a set of apertures in the second support member; and a set of fastening pins configured to (i) fasten the first support member to the first cutaway portion via the first set of apertures and the set of apertures in the first support member and (ii) fasten the second support member to the second cutaway portion via the second set of apertures and the set of apertures in the second support member.

Clause 27: The frame joint of Clause 26, wherein each fastening pin of the set of fastening pins comprises: an upper wing; a lower wing; and a spring attached to the upper wing and the lower wing and attaching thereto, wherein the upper wing and the lower wing are capable of flexing toward one another such that the fastening pin has an inward position, and wherein the spring is configured to push the upper wing and the lower wing away from one another such that the fastening pin has a neutral position.

Clause 28: The frame joint of Clause 27, wherein the upper wing has an upper notch and the lower wing has a lower notch, and wherein the upper notch and the lower notch are configured to be inserted through (i) the first set of apertures and the set of apertures in the first support member, and (ii) the second set of apertures and the set of apertures in the second support member.

Clause 29: The frame joint of Clause 27, wherein the upper wing and the lower wing are contoured to match the shape of the two support members such that the upper wing and the lower wing are configured to be flush with an interior surface of the two support members when inserted.

Clause 30: A frame joint for an above-ground pool, the frame joint configured to receive two support members for the above-ground pool, the frame joint comprising: a joint having a first cutaway portion on a first end of the joint, the first cutaway portion (i) configured to laterally support a first support member of the two support members and (ii) comprising a first set of apertures configured to align with a set of apertures in the first support member; a second cutaway portion on a second end of the joint, the second cutaway portion (i) configured to laterally support a second support member of the two support members and comprising a second set of apertures configured to align with a set of apertures in the second support member; a face plate detachably attachable to the joint such that an end of each of the two support members can be secured between the face plate and the joint when the face plate is detachably attached to the joint; and a set of fastening pins configured to (i) fasten the first support member to the first cutaway portion via the first set of apertures and the set of apertures in the first support member and (ii) fasten the second support member to the second cutaway portion via the second set of apertures and the set of apertures in the second support member.

Clause 31: The frame joint of Clause 30, wherein each fastening pin of the set of fastening pins comprises: an upper wing; a lower wing; and a spring attached to the upper wing and the lower wing and attaching thereto, wherein the upper wing and the lower wing are capable of flexing toward one another such that the fastening pin has an inward position, and wherein the spring is configured to push the upper wing and the lower wing away from one another such that the fastening pin has a neutral position.

Clause 32: The frame joint of Clause 31, wherein the upper wing has an upper notch and the lower wing has a lower notch, and wherein the upper notch and the lower notch are configured to be inserted through (i) the first set of apertures and the set of apertures in the first support member, and (ii) the second set of apertures and the set of apertures in the second support member.

Clause 33: The frame joint of Clause 31, wherein the upper wing and the lower wing are contoured to match the shape of the two support members such that the upper wing and the lower wing are configured to be flush with an interior surface of the two support members when inserted.

Clause 34: A frame structure for an above-ground pool, the frame structure comprising: two horizontal support members; a vertical support member; and a joint configured to join the two horizontal support members and the vertical support member, the joint comprising: a first cutaway portion on a first end of the joint, the first cutaway portion (i) configured to laterally support a first support member of the two horizontal support members and (ii) comprising a first set of apertures configured to align with a set of apertures in the first support member; a second cutaway portion on a second end of the joint, the second cutaway portion (i) configured to laterally support a second support member of the two horizontal support members and (ii) comprising a second set of apertures configured to align with a set of apertures in the second support member; and a set of fastening pins configured to (i) fasten the first support member to the first cutaway portion via the first set of apertures and the set of apertures in the first support member and (ii) fasten the second support member to the second cutaway portion via the second set of apertures and the set of apertures in the second support member.

Clause 35: The frame structure of Clause 34, wherein, when the above-ground pool is in an installed state, a first end of the vertical support member abuts a surface supporting the above-ground pool.

Clause 36: The frame structure of Clause 34, further comprising a set of fastening pins connecting the joint and the two horizontal support members.

Clause 37: The frame structure of Clause 34, further comprising a set of fastening pins connecting the joint and the vertical support member.

Clause 38: The frame structure of any of Clauses 36 or 37, wherein each fastening pin of the set of fastening pins comprises: an upper wing; a lower wing; and a spring attached to the upper wing and the lower wing and attaching thereto, wherein the upper wing and the lower wing are capable of flexing toward one another such that the fastening pin has an inward position, and wherein the spring is configured to push the upper wing and the lower wing away from one another such that the fastening pin has a neutral position.

Clause 39: The frame structure of Clause 38, wherein the upper wing has an upper notch and the lower wing has a lower notch, and wherein the upper notch and the lower notch are configured to be inserted through (i) the first set of apertures and the set of apertures in the first support member, and (ii) the second set of apertures and the set of apertures in the second support member.

Clause 40: The frame structure of Clause 38, wherein the upper wing and the lower wing are contoured to match the shape of the two horizontal support members such that the upper wing and the lower wing are configured to be flush with an interior surface of the two horizontal support members when inserted.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An above-ground pool comprising:
a base;
at least one pool sidewall defining the entire pool area and joined to the base; and a support element comprising:
two horizontal support members; a
vertical support member; and
a joint configured to join at least the two horizontal support members through insertion, wherein the joint comprises a joint sidewall and a lateral cutaway opening located on the joint sidewall, the lateral cutaway opening configured to laterally receive at least one of the two horizontal support members.

2. The above-ground pool of claim 1, the support element further configured to keep the at least one pool sidewall elevated off the ground.

3. The above-ground pool of claim 1, wherein the base is rectangular, rectangular with rounded corners, square, square with rounded corners, circular, oval, oblong, elliptical, triangular, pentagonal, hexagonal, octagonal, or decagonal.

4. The above-ground pool of claim 1, wherein the at least one pool sidewall and base comprise polyurethane, PVC, nylon, vinyl, or a textile coated with a material impermeable to water.

5. The above-ground pool of claim 1, wherein, when the above-ground pool is in an installed state, a first end of the vertical support member abuts a surface supporting the above-ground pool.

6. The above-ground pool of claim 1, further comprising a set of fastening pins connecting the joint and the two horizontal support members.

7. The above-ground pool of claim 1, further comprising a set of fastening pins connecting the joint and the vertical support member.

8. The above-ground pool of claim 7, wherein each fastening pin of the set of fastening pins comprises:
   an upper wing;
   a lower wing; and
   a spring attached to the upper wing and the lower wing and attaching thereto, wherein the upper wing and the lower wing are capable of flexing toward one another such that the fastening pin has an inward position, and
      wherein the spring is configured to push the upper wing and the lower wing away from one another such that the fastening pin has a neutral position.

9. The above-ground pool of claim 8, wherein the upper wing has an upper notch and the lower wing has a lower notch, and wherein the upper notch and the lower notch are configured to be inserted through a first set of apertures in the joint and a second set of apertures in the two horizontal support members.

10. The above-ground pool of claim 8, wherein the upper wing and the lower wing are contoured to match the shape of the two horizontal support members such that the upper wing and the lower wing are configured to be flush with an interior surface of the two support members when inserted.

11. An above-ground pool comprising:
   a base;
   at least one pool sidewall that, when in a deployed configuration, defines an interior volume of the above-ground pool and joined to the base; and
   a support element comprising:
      two horizontal support members;
      a vertical support member;
      a joint configured to receive and join the vertical support member;

a face plate detachably attachable to the joint such that to sandwich an end of each of the two horizontal support members can be secured between the face plate and the joint when the face plate is attached to the joint.

12. The above-ground pool of claim 11, the support element further configured to keep the at least one pool sidewall elevated off the ground.

13. The above-ground pool of claim 11, wherein the base is rectangular, rectangular with rounded corners, square, square with rounded corners, circular, oval, oblong, elliptical, triangular, pentagonal, hexagonal, octagonal, or decagonal.

14. The above-ground pool of claim 11, wherein the at least one pool sidewall and base comprise polyurethane, PVC, nylon, vinyl, or a textile coated with a material impermeable to water.

15. The above-ground pool of claim 11, wherein, when the above-ground pool is in an installed state, a first end of the vertical support member abuts a surface supporting the above-ground pool.

16. The above-ground pool of claim 11, further comprising a set of fastening pins connecting the joint and the two horizontal support members.

17. The above-ground pool of claim 11, further comprising a set of fastening pins connecting the joint and the vertical support member.

18. The above-ground pool of claim 17, wherein each fastening pin of the set of fastening pins comprises:
   an upper wing;
   a lower wing; and
   a spring attached to the upper wing and the lower wing and attaching thereto, wherein the upper wing and the lower wing are capable of flexing toward one another such that the fastening pin has an inward position, and
wherein the spring is configured to push the upper wing and the lower wing away from one another such that the fastening pin has a neutral position.

19. The above-ground pool of claim 18, wherein the upper wing has an upper notch and the lower wing has a lower notch, and wherein the upper notch and the lower notch are configured to be inserted through a first set of apertures in the joint, a second set of apertures in the faceplate, and a third set of apertures in the two horizontal support members.

20. The above-ground pool of claim 18, wherein the upper wing and the lower wing are contoured to match the shape of the two horizontal support members such that the upper wing and the lower wing are configured to be flush with an interior surface of the two support members when inserted.

* * * * *